US012805441B2

(12) United States Patent
Pendleton

(10) Patent No.: US 12,805,441 B2
(45) Date of Patent: *Nov. 24, 2026

(54) DEVICE FOR EXTRACTING AND USING AUXILIARY POWER

(71) Applicant: William G. Pendleton, Helenville, WI (US)

(72) Inventor: William G. Pendleton, Helenville, WI (US)

( * ) Notice: Subject to any disclaimer, the term of this patent is extended or adjusted under 35 U.S.C. 154(b) by 807 days.

This patent is subject to a terminal disclaimer.

(21) Appl. No.: 17/987,793

(22) Filed: Nov. 15, 2022

(65) Prior Publication Data

US 2023/0180663 A1 Jun. 15, 2023

Related U.S. Application Data

(63) Continuation of application No. 16/882,901, filed on May 26, 2020, now Pat. No. 11,497,167, which is a continuation of application No. 15/877,238, filed on Jan. 22, 2018, now Pat. No. 10,660,269.

(51) Int. Cl.

| | |
|---|---|
| ***A01D 69/00*** | (2006.01) |
| ***A01D 34/00*** | (2006.01) |
| ***A01D 34/82*** | (2006.01) |
| ***A01D 34/84*** | (2006.01) |
| ***A01D 43/16*** | (2006.01) |
| *A01D 101/00* | (2006.01) |

(52) U.S. Cl.

CPC ........... *A01D 43/16* (2013.01); *A01D 34/001* (2013.01); *A01D 34/822* (2013.01); *A01D 69/002* (2013.01); *A01D 34/84* (2013.01); *A01D 2101/00* (2013.01)

(58) Field of Classification Search

CPC ...... F16D 43/208; F16D 43/204; Y10S 56/06; A01D 34/00; A01D 34/001; A01D 34/58; A01D 34/412; A01D 34/66; A01D 34/822; A01D 34/863; A01D 34/866; A01D 34/416–4168; A01D 34/84; A01D 2101/00; A01D 69/02; A01D 69/002; A01D 43/16

USPC ........................................................ 192/56.6

See application file for complete search history.

(56) References Cited

U.S. PATENT DOCUMENTS 2,600,674 A * 6/1952 Natkins ..................... F16D 7/08 464/36
2,790,292 A * 4/1957 Trecker ................ A01D 34/001 56/16.9
2,888,084 A * 5/1959 Trecker .................. A01B 1/065 56/13.7

(Continued)

*Primary Examiner* — Adam J Behrens
(74) *Attorney, Agent, or Firm* — Lisa Foundation Patent Law Clinic; Avery Underwood

(57) ABSTRACT

A device for extracting auxiliary power from a power source installed on or associated with an implement, and supplying the auxiliary power to an auxiliary tool associated with the implement. The invention is preferably employed in the context of an auxiliary tool, e.g., in the form of a rotary trimmer, edger or the like, associated with another power implement, such as a lawnmower, wherein the power is preferably extracted from a driven member of the implement. Advantageously, the device is easy to attach/detach, is universally locatable and/or orientable on the implement, and is easily retrofittable to practically any existing implement, such as a lawnmower deck.

18 Claims, 10 Drawing Sheets

(56) References Cited

U.S. PATENT DOCUMENTS 2,983,121 A * 5/1961 Naas ........................ F16D 7/08 464/36
4,152,882 A * 5/1979 Howard ............... A01D 34/001 56/13.7
4,242,855 A * 1/1981 Beaver, Jr. ........... A01D 34/001 56/16.8
4,453,372 A * 6/1984 Remer ................... A01D 43/16 56/DIG. 4
4,642,976 A * 2/1987 Owens ................... A01D 43/16 56/11.8
4,653,254 A * 3/1987 Qualls .................. A01D 34/001 56/16.9
4,715,169 A * 12/1987 Ould ...................... A01D 43/16 56/16.9
4,896,488 A * 1/1990 Duncan .................. A01D 43/16 56/16.9
5,065,566 A * 11/1991 Gates ................... A01D 34/416 56/12.7
5,167,108 A * 12/1992 Bird ....................... A01D 43/16 56/11.8
5,226,284 A * 7/1993 Meehleder ............ A01D 43/16 56/16.9
5,560,189 A * 10/1996 Devillier ................ A01D 43/16 172/14
5,960,617 A * 10/1999 Sheldon ............. A01D 34/6806 56/255
6,343,461 B1 * 2/2002 Knott ..................... A01D 43/16 56/16.9
6,430,906 B1 * 8/2002 Eddy ...................... A01D 43/16 56/13.7
6,434,920 B1 * 8/2002 Keane .................... A01D 43/16 56/DIG. 17
6,457,301 B1 * 10/2002 Buss ...................... A01D 43/16 56/14.7
6,474,053 B1 * 11/2002 Lund ...................... A01D 43/16 56/13.7
6,546,706 B1 * 4/2003 Nafziger ................ A01D 43/16 56/13.7
6,779,325 B1 * 8/2004 Robillard ............... A01D 34/82 56/12.7
6,892,518 B1 * 5/2005 Bares ..................... A01D 34/82 56/10.4
6,966,168 B1 * 11/2005 Kerr, Sr. ................ A01D 43/16 56/12.7
6,986,238 B1 * 1/2006 Bloodworth ........... A01D 34/84 56/17.6
7,004,668 B2 * 2/2006 Lombardo ................ F16C 1/08 403/333
7,516,602 B1 * 4/2009 O'Dell ................... A01D 34/84 56/16.9
7,549,278 B2 * 6/2009 McMahan .............. A01D 34/84 56/13.7
7,877,971 B1 * 2/2011 Hallinan ................ A01D 43/16 56/10.4
7,900,428 B1 * 3/2011 Maldonado ............ A01D 34/84 56/16.9
7,975,459 B1 * 7/2011 Murawski .............. A01D 43/16 56/13.6
8,302,372 B1 * 11/2012 Eubanks ................ A01D 43/16 56/16.9
8,322,121 B1 * 12/2012 Marcell .................. A01D 34/84 56/13.6
8,464,504 B1 * 6/2013 Huff ....................... A01D 43/16 56/13.7
8,474,231 B1 * 7/2013 Maldonado ............ A01D 43/10 56/13.7
8,516,783 B1 * 8/2013 Maldonado ............ A01D 43/16 56/13.7
8,973,343 B2 * 3/2015 Bell ....................... A01D 34/66 56/13.7
9,510,506 B2 * 12/2016 Castelli .............. A01D 34/4165
9,560,803 B2 * 2/2017 Kobayashi ............. A01D 43/16
9,872,432 B1 * 1/2018 Millikan ................ A01D 34/84
2002/0174635 A1 * 11/2002 Mitchell, Jr. .......... A01D 34/84 56/12.7
2005/0193700 A1 * 9/2005 Bares ................... A01D 34/001 56/12.7
2006/0005520 A1 * 1/2006 Weidman ............. A01D 34/416 56/12.7
2006/0021314 A1 * 2/2006 Hatfield ................. A01D 34/84 56/12.7
2007/0130901 A1 * 6/2007 McMahan .............. A01D 34/84 56/13.7
2007/0193240 A1 * 8/2007 Nafziger .............. A01D 34/416 56/13.7
2010/0000192 A1 * 1/2010 Robison ................. A01D 34/84 56/10.2 R
2010/0326031 A1 * 12/2010 Branden ................ A01D 43/16 56/12.7
2010/0326032 A1 * 12/2010 Leonardi .............. A01D 34/416 56/17.1
2013/0239534 A1 * 9/2013 Branden ................ A01D 43/16 56/12.7
2014/0041353 A1 * 2/2014 MacDonald ........... A01D 34/84 56/12.7
2014/0123614 A1 * 5/2014 Hofmeister ............ A01D 34/84 56/12.7
2014/0202128 A1 * 7/2014 Bell ..................... A01D 34/824 56/12.7
2015/0040529 A1 * 2/2015 Standridge ........... A01D 34/416 56/13.7
2015/0052867 A1 * 2/2015 Castelli .................. A01D 34/84 56/229
2015/0208575 A1 * 7/2015 Miller .................. A01D 34/001 56/12.7
2016/0014958 A1 * 1/2016 Kobayashi ............. A01D 43/16 29/428
2017/0006775 A1 * 1/2017 Wyne ................... A01D 34/733
2017/0339825 A1 * 11/2017 Arnetoli ............... A01D 34/733
2018/0077861 A1 * 3/2018 Lego .................. A01D 34/4165
2019/0008090 A1 * 1/2019 Dretzka ................. A01D 34/82

* cited by examiner

DEVICE FOR EXTRACTING AND USING AUXILIARY POWER

BACKGROUND OF THE INVENTION

The present invention relates to a device for extracting auxiliary power from a power source, and more particularly to a device for extracting auxiliary power from a power source installed on or associated with an implement, and supplying the auxiliary power to an auxiliary tool associated with the implement. In a typical preferred embodiment, the invention is advantageously employed in the context of an auxiliary tool, e.g., in the form of a rotary trimmer, edger or the like associated with another power implement, such as a lawn mower. The power is preferably extracted from a driven member of the implement, which maximizes retro-fitability.

There have been many prior attempts to provide devices for extracting auxiliary power from a power source, including in the context of supplying auxiliary power to an auxiliary tool such as a rotary trimmer. One such attempt is illustrated in Qualls U.S. Pat. No. 4,653,254, which relates to a hand-held string trimmer that is powered by the engine on a push lawnmower, by attaching a collar member 28 to the top end of shaft 16 of the motor power source 12 of the lawnmower and connecting the collar and trimmer with a flexible drive shaft. Attachment is by means of a detent fit between circumferential shoulder 36 of a first cylindrical locking member 32 and recess 44 extending circumferentially about the interior of coupling member 42. Similar is Beaver U.S. Pat. No. 4,242,855, which also discloses the option of additionally driving a sprayer pump from a pulley attached to the top end of the motor drive shaft.

Another attempt is illustrated in Owens U.S. Pat. No. 4,642,976, which is directed to an attachment for edging or trimming grass that is designed to be attached to a lawnmower or a vehicle/riding lawnmower by a bracket, in such a way that the edger/trimmer head can be raised, lowered and rotated with respect to the bracket. At the end of the head opposite its cutting members, there is a quick disconnect joint which allows either an electric motor to be mounted and energized by electrical power available aboard the mower, or alternatively allows a cable drive to be mounted which drives the head from a friction drive mechanism taking power from the mower engine shaft.

Borunda U.S. Pat. No. 3,604,208 discloses an alternative arrangement for powering an edger from the engine of a push lawnmower. A bevel gear mounted on the vertical drive shaft of the engine allows selective engagement of a mating bevel gear to drive the trimmer. The mower blade is also selectively engageable.

U.S. Pat. No. 4,559,768 to Dunn describes a device such as a push lawnmower that has a gasoline-powered engine/generator mounted on the mower deck. This generator can be used to power an electrically-driven mower blade, or alternatively an auxiliary device, such as a trimmer.

Several other devices have been proposed in which an auxiliary pulley is secured to the drive mechanism of a mower, where this pulley is employed to drive an auxiliary trimmer. On such device is shown in Ould U.S. Pat. No. 4,715,169, which has a trimmer mounted on the mower deck and a flexible shaft driving the trimmer from a secondary pulley that is belt-driven from the auxiliary pulley attached to the top end of the motor drive shaft. Bares U.S. Pat. No. 6,892,518 discloses an edge trimmer assembly that is mountable on the deck of a lawnmower, such as a riding lawnmower having a mower deck comprising a plurality of cutting blades. In one embodiment, the trimmer is driven by an auxiliary v-belt surrounding an auxiliary pulley attached to one of the pulleys that is part of the mower deck and is used to drive one of the blades.

In addition to the Bares patent, two other patent documents (Hatfield U.S. Pat. No. 7,219,488 and Heighton US 2004/0237491) are illustrative of today's state-of-the-art regarding the professional/commercial lawnmowing trade, in which the use of an auxiliary trimmer device is found to be very desirable in order to increase efficiency and lower the labor cost of caring for extensive areas of lawn, e.g., cemeteries, office buildings, parks, public buildings, schools, etc. Most typically, the so-called "Zero-Turn Radius" (ZTR) riding lawnmowers have been found to be most efficient and are consequently used for the most significant part of this trade, i.e., in which there is usually a company-owned fleet comprised of a plurality of mowing machines that, over time, evolve (due to addition and/or replacement) to include machines of multiple different configurations.

In most of these documents, the intent is to provide an auxiliary device, such as a trimmer, that is retrofittable to existing commercial lawnmower models. However, in each instance, the respective devices are practically limited to a very small number of commercial products, and/or the retrofit requires substantial and not quickly reversible changes to existing commercial machines, e.g., firmly attaching auxiliary drive parts to a shaft that is either an engine drive shaft or part of a pulley for powering a mower cutting blade. Furthermore, each of the many commercially available Zero-Turn mowers is configured differently (as is the case for nearly all other designs for lawnmowers, large and small), such that there is virtually no practical possibility to utilize any of these devices interchangeably from one machine to another. Although the use of magnets has been known for centuries to temporarily attach items together, including temporarily holding a flashlight, even on a lawn mower (See US 2016/0116145A12), magnets are not deemed suitable for attaching parts of machinery together, particularly driving/driven pairs of parts and/or moving parts that are subject to forces and/or vibration, as in the context of, for example, a power lawn mower.

The same is true with respect to the mechanism for mounting an auxiliary trimmer onto the body or mower deck of these commercially used mowers. Apart from having to detach and re-attach the specially configured bracket mechanisms when attempting to switch between different mower models, in many cases the brackets will not readily fit onto differently configured mower decks. In addition, there are mutually-contradictory demands, on the one hand, to be able to easily move an auxiliary trimmer into the needed orientation vis-à-vis the mower deck, and on the other hand, to simultaneously protect the trimmer from damage and/or detachment upon inadvertently striking an obstacle with the trimmer.

For these reasons, the market does not currently offer a practical, universally usable and retrofittable auxiliary trimmer attachment, whereby those responsible for maintaining large tracts of lawn have not been able to make full use of the economically advantageous option of simultaneously mowing and trimming utilizing a single mower unit, especially in the case of commercial fleets of mowing machines that comprise plural machines of differing configurations. There is a current demand for a product that is capable of fulfilling this need.

SUMMARY OF THE INVENTION

In accordance with one aspect of the present invention, there has been provided a device for extracting auxiliary power from a power source installed on or associated with an implement and supplying the auxiliary power to an auxiliary tool associated with the implement, comprising: a coupling device that is adapted to interact with the power source installed on or associated with the implement, wherein, when the coupling device is positioned to interact with the power source, the coupling device extracts auxiliary power from the power source; an auxiliary tool associated with the implement in a manner such that the auxiliary tool can be operated by means of the auxiliary power that is extracted by the coupling device from the power source that is installed on or associated with the implement; and an auxiliary power transmission arrangement for transmitting auxiliary power from the coupling device to the auxiliary tool, wherein at least one of the coupling device and the auxiliary tool comprises a magnetically actuated attachment member for associating the coupling device and/or the auxiliary tool with the implement. Most preferably, both the coupling device and the auxiliary tool comprise a magnetically actuated attachment member.

In some preferred embodiments, the coupling device is capable of being manipulated into a plurality of arbitrarily-selectable spatial configurations to accommodate unique shapes of a plurality of different implements, preferably by having a plurality of supporting parts, at least some of which are movable laterally and/or adjustable in vertical length. Most preferably, the number of spatial configurations is very large, to accommodate mounting on nearly any machine configuration.

In some preferred embodiments, the power source comprises a moving part on the implement which is driven by the power source, preferably the shaft of a pulley on a mower deck, most preferably a bolt head or a nut on a drive- and/or a driven-pulley. In these embodiments, it is preferred that the coupling device comprises a socket that fits over the bolt head or nut.

In other preferred embodiments, the arrangement for transmitting auxiliary power comprises a shock-absorbing and/or break-away mechanism, to deal with the case of an auxiliary tool stoppage or disruption. Most preferably, the auxiliary tool incorporates a break-away feature in its mounting on the implement, and/or a shock-absorbing feature.

In one of its most preferred embodiments, the invention is embodied on a ridable lawnmower, such as a self-powered mower, a towed mower or a front mounted mower, preferably a self-powered mower, such as a lawn tractor with mounted mower deck or a dedicated riding mower, most preferably a Zero-Turn mower of the sit-upon or stand-upon type. The invention is equally applicable to older models of ridable lawnmowers, such as those comprising a lawn tractor with a detachable mower deck, a tractor having a side-mounted mowing device and/or a towable mowing device that is designed to be towed (or pushed) by any kind of pulling/pushing device, including a tractor, lawn tractor, a vehicle, such as a truck, and/or utility vehicle, such as an ATV.

In accordance with another aspect of the present invention, there has also been provided a device for extracting auxiliary power from a power source installed on or associated with an implement and supplying the auxiliary power to an auxiliary tool associated with the implement, comprising: a coupling device that is adapted to interact with the power source installed on or associated with the implement, wherein when the coupling device is positioned to interact with the power source, the coupling device extracts auxiliary power from the power source; an auxiliary tool associated with the implement in a manner such that the auxiliary tool can be operated by means of the auxiliary power that is extracted by the coupling device from the power source that is installed on or associated with the implement; and an auxiliary power transmission arrangement for transmitting auxiliary power from the coupling device to the auxiliary tool, wherein the coupling device is capable of being configured into a plurality of different configurations and is thereby capable of being retrofitted to any of a plurality of differently-configured power source arrangements.

In some preferred embodiments, the power source installed on or associated with the implement comprises a moving part, preferably a moving part that supplies rotary power to cutting blades on the implement. This moving part is preferably either a drive pulley or, more preferably, a driven pulley providing rotary power to the cutting blades, and is preferably part of mower cutting deck. Preferably, the coupling device is selectively engageable with the moving part to extract auxiliary power from the moving part. Such engagement is preferably achieved by the coupling device comprising a socket that couples with a bolt head/nut on the moving part, which is preferably a drive- and/or driven-pulley.

In certain preferred embodiments, coupling device comprises at least one movable/adjustable support member for supporting the coupling device on the implement, to provide for customized retro-fitting of coupling device to a plurality of different implement configurations.

In other preferred embodiments, the coupling device has a magnetically actuated attachment member that fixes the coupling device in an engaged power-transmitting position with respect to the power source that is installed on or associated with the implement.

In other preferred embodiments, the auxiliary tool comprises a magnetically actuated attachment member that provides at least one of the following advantages: associating the auxiliary tool with the implement in such a way that the tool is capable of plural (preferably a large number of) arbitrarily-selectable mounting configurations upon the implement, and in such a way that the tool includes the possibility of a shock-absorbing and/or break-away protection in the event of a collision beyond a pre-selected magnitude of force.

In some preferred embodiments, an auxiliary tool support arm can be either fixedly attached to a support post, or it can be attached in a manner that provides vertical adjustment, lateral adjustment and/or rotational adjustment to the auxiliary tool attached. In one embodiment, the support arm can be adjusted in height and/or horizontal arc of rotation with respect to the support post, and/or the arm can be mounted for articulation in a vertical arc to provide vertical adjustment of the tool 50.

In another preferred embodiment, the support structure provides for selective lateral adjustment of the auxiliary tool by the implement operator, e.g., wherein the auxiliary tool further comprises a device for selectively adjusting the lateral position of the auxiliary tool with respect to the implement, preferably a remotely controlled rack-and-pinion device.

In other preferred embodiments, the power transmission arrangement comprises a shock-absorbing and/or break-away feature to prevent damage to the arrangement in the case of slowdown and/or stoppage of the auxiliary tool.

Preferably, the shock-absorbing and/or break-away feature comprises a clutch mechanism installed in a flexible drive cable arranged in a power-transmitting relationship between the auxiliary tool and the coupling device.

In other preferred embodiments, the power transmission arrangement comprises a means for selectively engaging and disengaging the auxiliary tool that is attached to the power-supplying implement. One selective power engagement/disengagement mechanism is capable of selectively lowering a socket piece into engagement with bolt head, and selectively raising the socket piece out of engagement with bolt head, preferably by means of a helical slot and pin arrangement.

Further objects, advantages and preferred embodiments of the invention are described in and/or will become apparent from the detailed description of preferred embodiments that follows, when considered together with the accompanying figures of drawing.

DETAILED DESCRIPTION OF PREFERRED EMBODIMENTS

Figure 1:
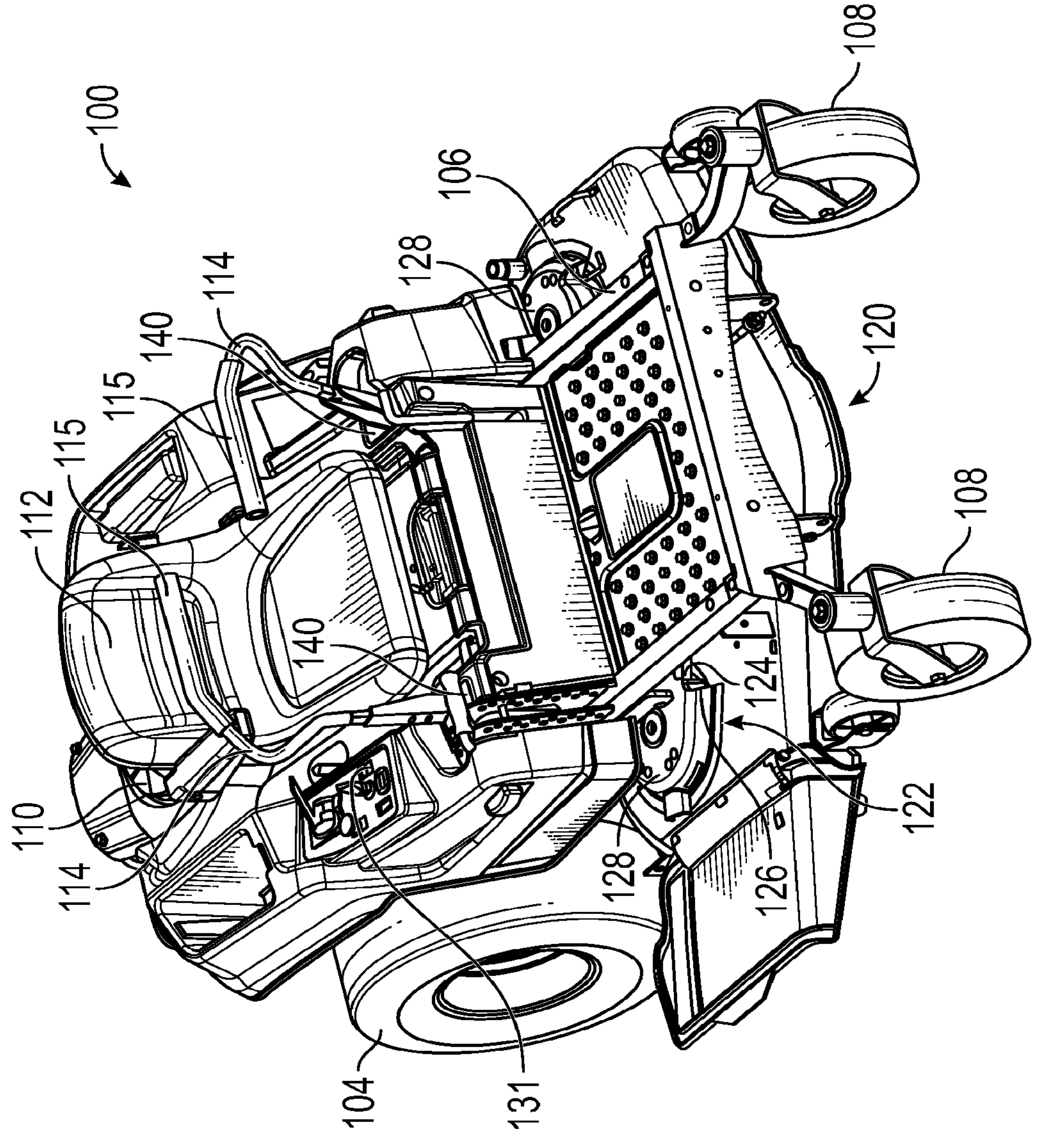
FIG. 1 (Prior Art)
FIG. 1 is a perspective view of a typical prior art Zero-Turn-Radius mower (ZTR mower)

FIG. 1 shows one embodiment of a typical prior art Zero-Turn-Radius mower (ZTR mower) 100 having a pair of rear drive wheels 104 that are independently powered so that each rear drive wheel rotates independently of the other rear drive wheel. Each independent drive includes an integrated hydrostatic pump and motor unit coupled to one of the rear drive wheels. Each hydrostatic pump may have a swash plate to define a pump stroke between a full forward position, a neutral position, and a reverse position. The ZTR mower has a frame 106 supported on a forward end by front wheels 108, and a rear mounted engine 110 behind operator seat 112. The seat may be mounted over the frame for a seated operator to use left and right motion control levers or sticks 114. The left and right motion control levers or sticks 114 are mounted on the ZTR mower and are pivotable between forward, neutral and reverse positions. Each motion control lever or stick is mounted to the ZTR mower so that the lever may pivot forwardly to move a swash plate in the hydrostatic pump in a first direction to cause a rear drive wheel 104 to rotate forward, or pivot rearwardly to move the swash plate in a second direction to cause the rear drive wheel to rotate backward. Each motion control lever or stick may have a neutral position in which the corresponding rear drive wheel is at rest. Each motion control lever or stick extends through an opening 140 adjacent or in front of the operator's seat on a ZTR mower, where the base 117 of each motion control lever or stick connects to the hydrostatic drive system of the ZTR mower.

Figure 2:
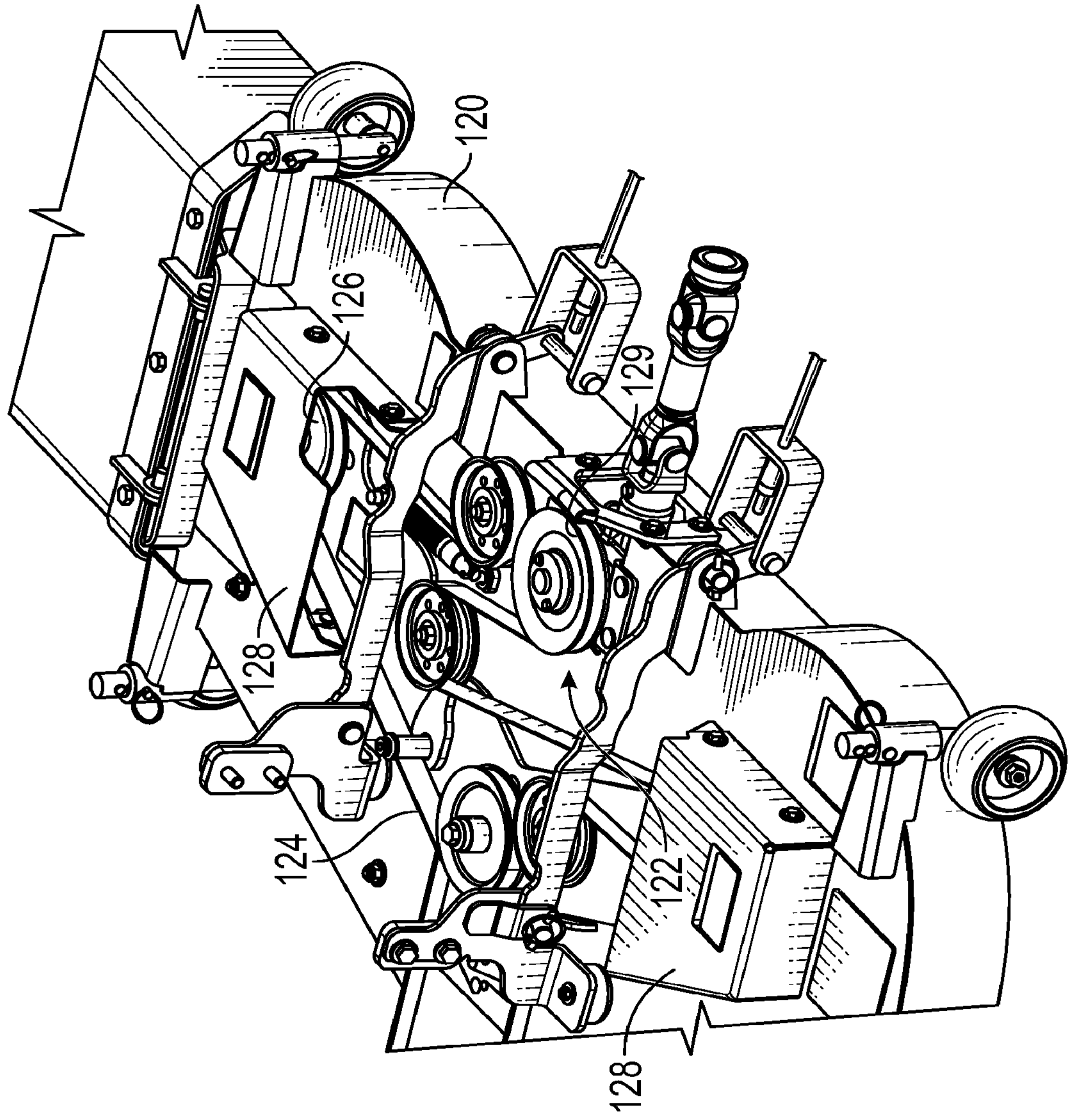
FIG. 2 (Prior Art)
FIG. 2 is perspective view of a typical prior art mower deck, of the type that may be used with a ZTR mower.

Below frame 106 is mounted a mower deck 120, which can be seen generally in FIG. 1 and more completely in FIG. 2, which shows one common design for a mower deck that can be employed in the case of a ZTR mower, but also is representative of mower decks generally. Mower deck 120 typically carries a plurality of rotary cutting blades (not shown here) that are driven by a belt drive system 122 comprised of at least one drive belt 124 passing around a driven pulley 126. A safety or pulley guard cover 128 covers the pulley 126 located on both sides of the mower deck 120. Drive belt 124 is powered by a drive pulley 129 (shown only in FIG. 2) that itself is powered by the engine 110.

The present invention is useful in connection with a very wide range of implements, including virtually any kind of mowing equipment. For example, FIG. 1 illustrates just one typical design of a ZTR mower, in this case a sit-upon model. The invention can alternatively be used in conjunction a stand-upon design for a ZTR mower can be seen in US 2017/0150681 A1, the entire content of which is hereby incorporated by reference. Further, the mower deck arrangement depicted in FIG. 2 is only generally illustrative of the type of mower deck on which the device of the invention can be employed. Thus, for example, a mower deck of this general design is frequently attached beneath a so-called "garden tractor" or any other type of tractor, as shown, for example, in US 2015/0121832 A1, the entire content of which is hereby incorporated by reference. Use of the invention is also contemplated in virtually any other configuration in which a mower deck is conveyed by a powered vehicle for mowing, for example, a mower deck that is towed behind a vehicle, either directly behind or laterally displaced (e.g., as shown in US 2014/0059991 A1) or a mower deck that is attached behind a vehicle using a 3-point hitch and powered by a power take-off (PTO) as shown e.g., in U.S. Pat. No. 8,166,735 The entire content of these last two documents is also hereby incorporated by reference.

In all of the illustrated embodiments of the application the auxiliary tool is depicted, for simplicity, as a string trimmer 50, mainly because this represents one of the most popular tools in use today for lawn and landscaping care. However, it is to be understood that the present invention is applicable to and includes within its scope virtually any kind of auxiliary tool that is power driven, such as an edger, saw with rotary blade, grinder, blower, vacuum, sweeper or the like.

Figure 5:
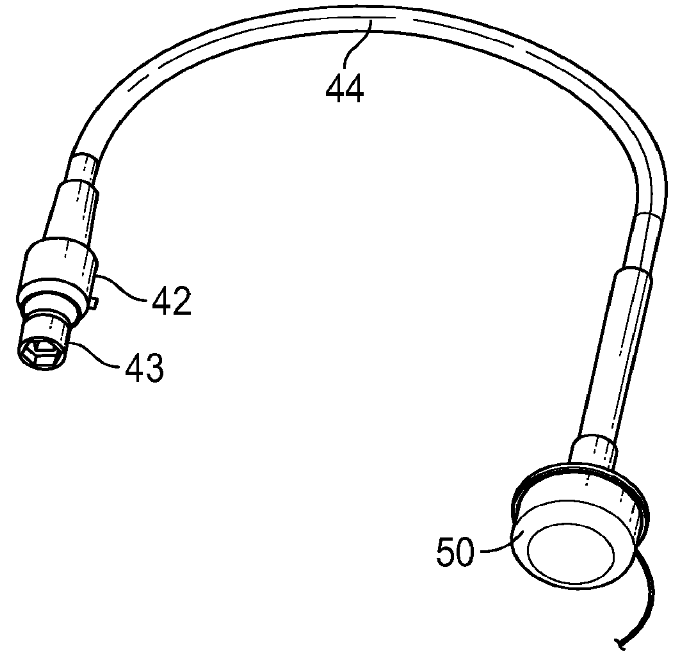
FIG. 5 is a schematic view showing power transmission arrangement and detail of the coupling device shown in FIG. 4.
Figure 6:
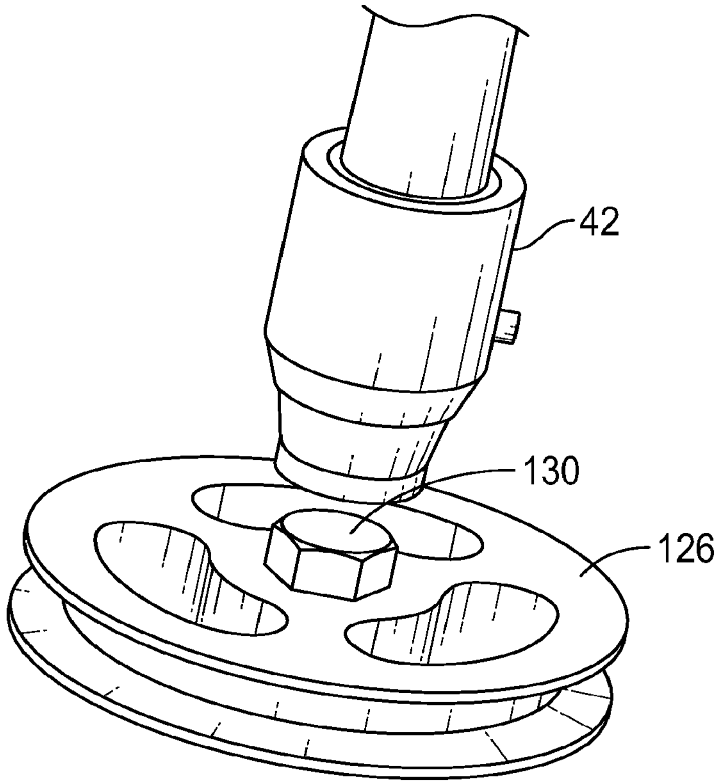
FIG. 6 is a detailed schematic view showing interaction between the coupling device and driven pulley of FIG. 4.

In accordance with the present invention, an auxiliary tool can be easily attached to a mowing device and driven from the power source of the mowing device. The device according to the invention for extracting auxiliary power to drive an auxiliary tool is easily retrofittable to a wide variety of powered devices, especially mowing devices. The power-extracting device of the invention interacts with a standard part that is present in almost every mowing machine that employs a mower deck, namely, a hexagonal (or other suitably shaped) bolt head that fastens a rotating pulley that is located over a mowing blade and that is used to provide rotary power to the blade. A corresponding hexagonal (or other shape) socket member of the invention fits over the bolt head and transfers power to the auxiliary device via a flexible cable or other means. FIG. 6 illustrates schematically how the hexagonal bolt head 130 cooperates with one preferred embodiment of a coupling device 42 according to the invention, which is bayonet-shaped and has a hexagonal recess 43 at its distal end. See also FIG. 5.

Mower decks typically include two blade-driving pulleys located at each outboard side of the deck, at positions that are readily accessible. Each of these pulleys is covered by a pulley guard cover provided by the original equipment manufacturer (OEM). There are several ways in which the hexagonal bolt heads can be accessed. In some cases, the OEM provides a circular or other opening to provide access to the bolt head, with the openings being fitted with a removable cover. These designs are the easiest to retrofit with the device of the invention, and having the device of the invention available to the market will encourage OEM's to provide pulley guard covers of this type in the future. In other cases, it will be necessary to either cut or punch an opening in the pulley guard cover, or to provide a custom replacement version of the OEM pulley guard cover that is provided with a suitable opening and can simply replace the original pulley guard cover.

Figure 3:
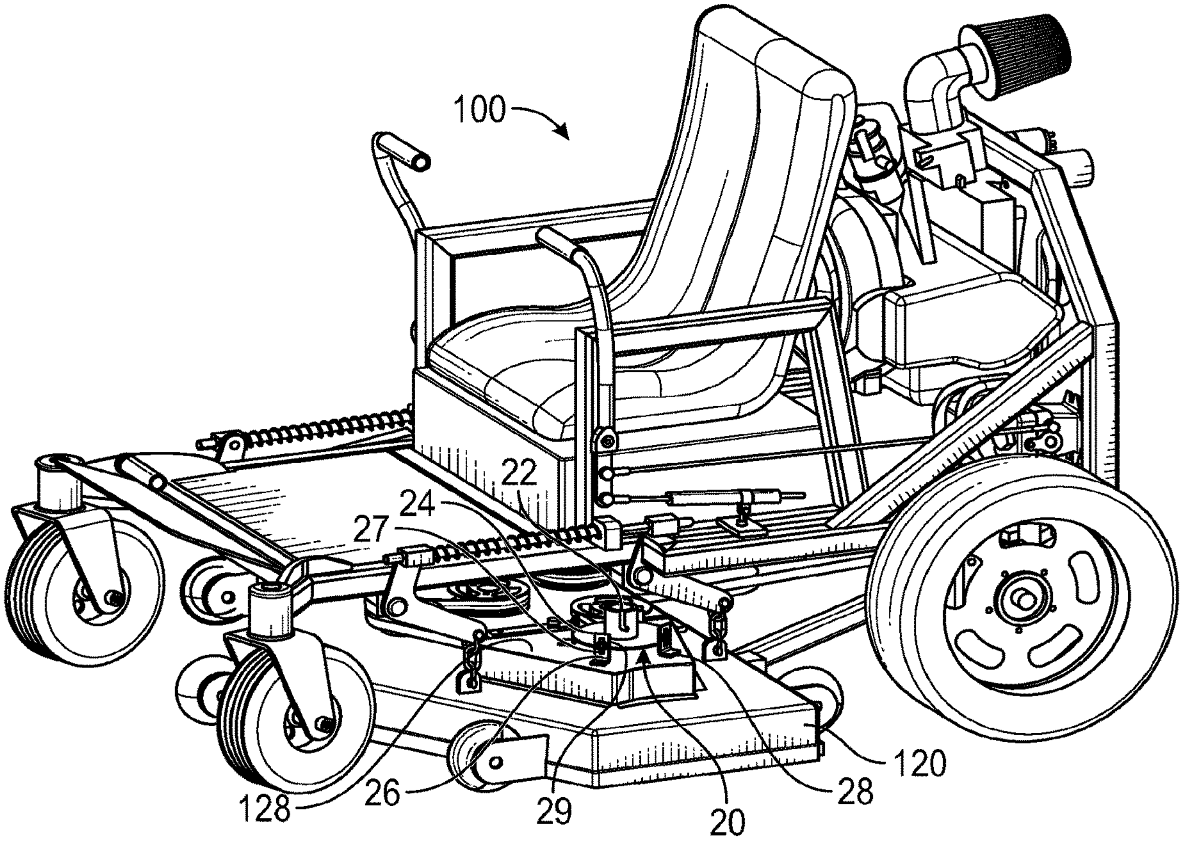
FIG. 3 is a perspective view of one preferred embodiment of the invention applied to a ZTR mower.

Referring now to FIG. 3, a ZTR mower 100 is illustrated that is retrofitted with a power coupling device 20 that is affixed to pulley guard cover 128 of mower deck 120. Power coupling device 20 allows an auxiliary tool (not shown) to be readily detached and interchanged with a second tool, if desired. This is accomplished in one preferred embodiment by providing a bayonet coupling receiver 22 mounted on plate 24, which is attached to pulley guard cover 128 in any conventional manner (by bolts, brackets, or the like), but, preferably in the manner illustrated in FIG. 3, namely, by magnetic attraction. In the illustrated embodiment, a plurality of legs 26 are attached to plate 24, and at the bottom of at least one or more of the plurality of legs 26 are located magnets 28 (wherein the magnets can be separately added pieces or the legs themselves can be magnetic). Most preferably, at least one or more, and most preferably all of the legs 26 embody means for adjusting the length of the leg, such as slots 27 that cooperate with bolts 29 that are attached to plate 24, e.g., by welding. See also FIG. 7. Any kind of adjustment mechanism can be used here. The adjustable legs 26 permit the power coupling device 20 to be retrofitted to virtually any shape of mower deck and/or pulley guard cover.

Figure 4:
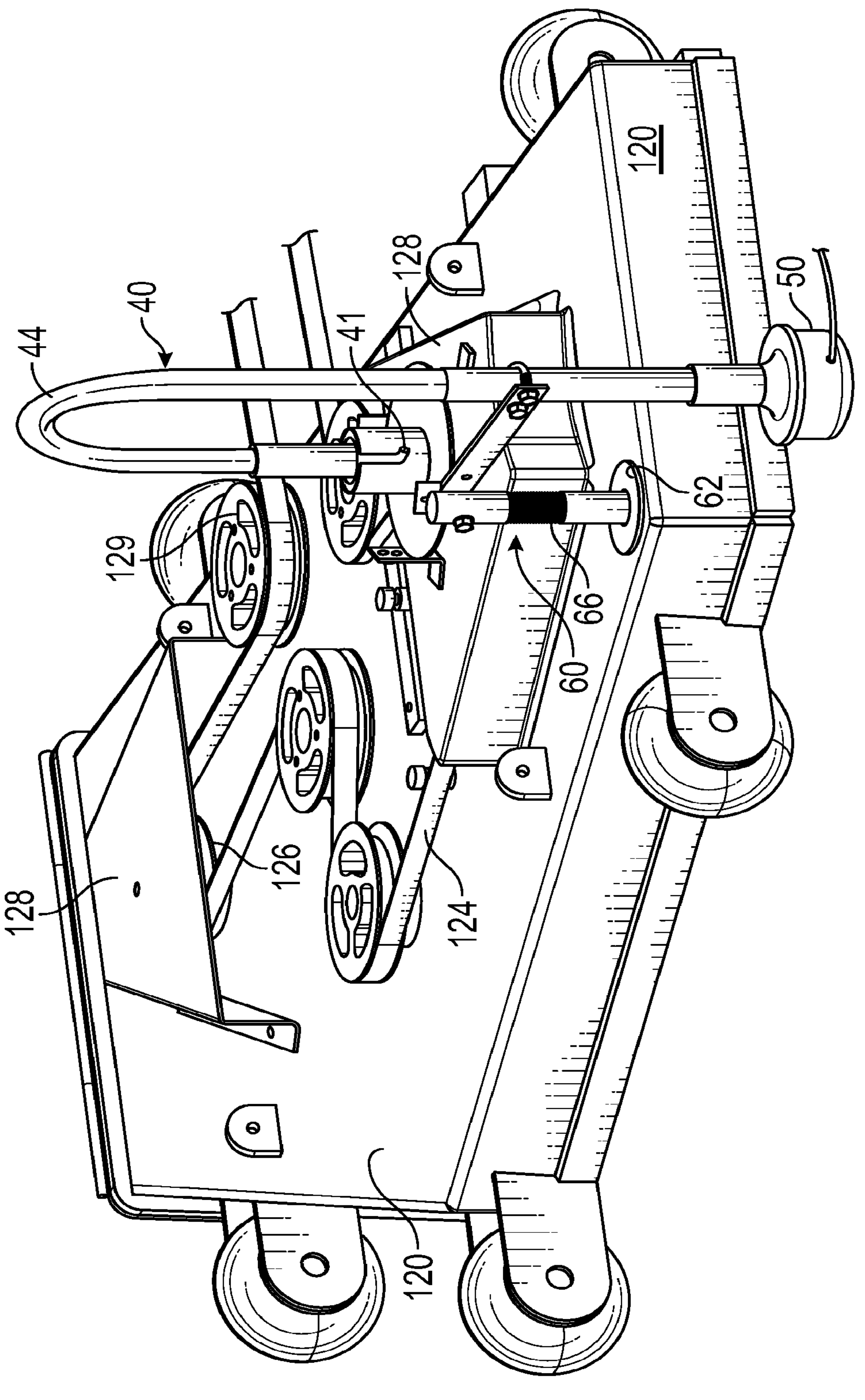
FIG. 4 is a perspective view of only the mower deck in FIG. 3, showing an auxiliary tool associated with the mower deck by means of one embodiment of a preferred, detachable coupling device and an auxiliary power transmission arrangement according to the invention.

FIG. 4 is an isolated view of the mower deck 120 portion of the preferred embodiment of the mowing machine 100, showing the complete assembled auxiliary tool 50 and the auxiliary power transmission arrangement 40, which includes a bayonet-shaped fitting 42 at the end of flexible drive cable 44, so as to detachably cooperate with bayonet coupling receiver 22 (FIG. 3), making it possible to selectively attach auxiliary tool 50 and/or selectively engage said tool with the mower's power source. The flexible drive cable 44 transfers rotary power to the auxiliary tool 50, and enables arbitrary placement of tool 50 at any position on the mower deck 120. The auxiliary tool 50 is supported by a support structure 60, which is described in more detail below with reference to FIG. 9.

Figure 7:
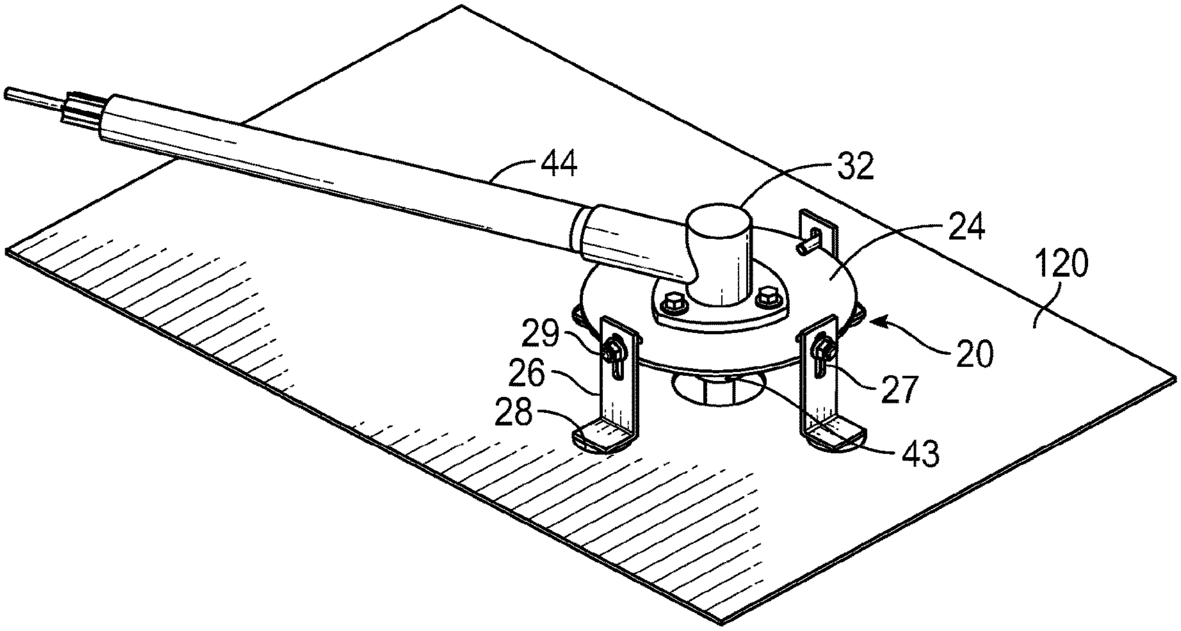
FIG. 7 is a schematic perspective view of the details of one embodiment of a coupling device according to the invention, as shown in FIG. 4.

FIG. 7 illustrates an alternative embodiment in which the coupling device and auxiliary power transmission arrangement are designed differently, but perform the same functions. Instead of bayonet receptacle 22 as shown in FIGS. 3 and 4, the embodiment of FIG. 7 employs an angled power transmission member 32 that is fixedly connected to plate 24 at one end and is connected to flexible cable 44 at its other end. The coupling device in this embodiment also employs adjustable legs 26 and magnetic members 28 at the base of the legs, for the purpose of adjustably fitting and fixing the coupling device 20 to mower deck 120, with registration of pulley bolt head 130 (not shown) and hexangular recess 43 in a power-transferring engagement.

Figure 8:
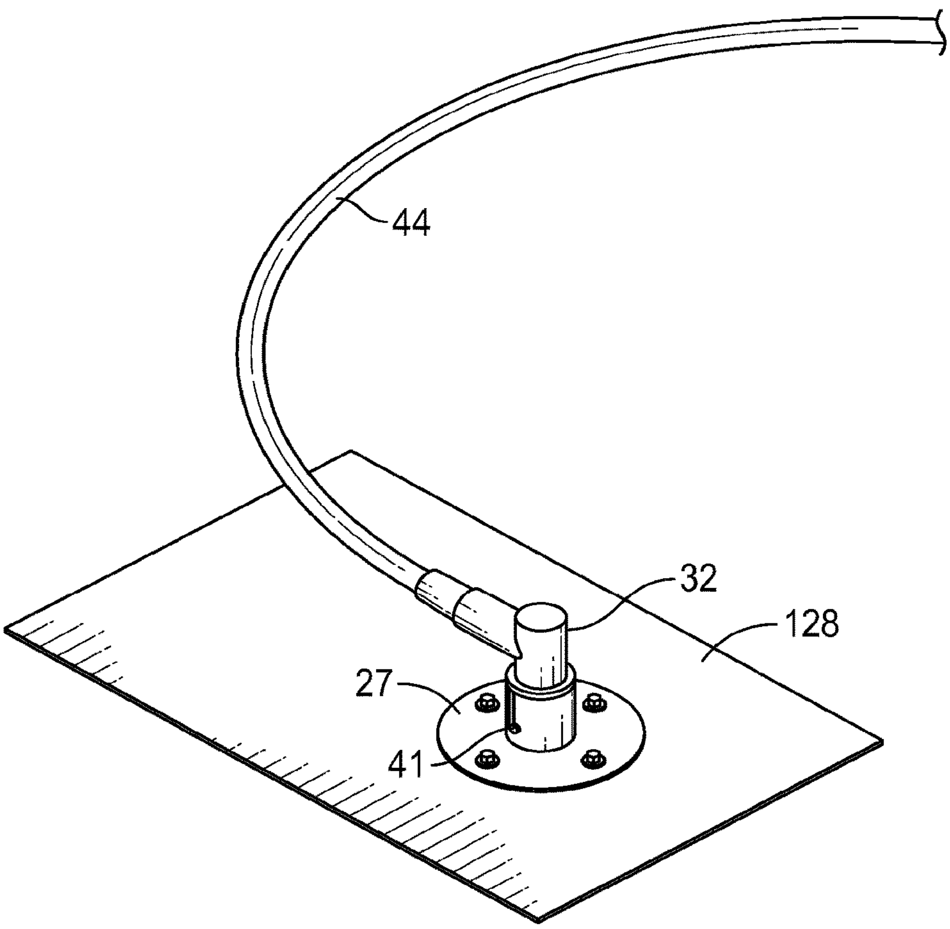
FIG. 8 is a schematic perspective view of the details of an alternative embodiment of a coupling device according to the invention.

Another alternative arrangement is shown in FIG. 8, in which angled power transmission member 32 is also employed, but this time the end closer to the mower deck 120 is provided with a bayonet-shaped fitting 42, designed to cooperate with bayonet receptacle 22, to produce a bayonet-type coupling configuration 41 as shown in FIG. 4. Further, the deck mounting plate 27 holding the bayonet receptacle 22 is shown as being bolted or screwed (or otherwise temporarily fastened, e.g., between clips, sliding or under fasteners) onto the pulley guard cover 128. Although this manner of attachment is also relatively easily removable, the more preferred manner of attaching deck mounting plate 27 is to make that plate of magnetic material, such that it may be very easily removed, adjusted or re-attached. Thus, in principle, any of the embodiments of the present invention can employ a magnetic plate 27 in place of the plate 24 that is provided with adjustable legs. In the case of a mower deck having a pulley guard cover with a flat surface, it is most preferred to employ a magnetic deck mounting plate as shown in FIG. 8, i.e., without any bolts. For any mowing devices that have an on-board electric power source, it is possible to employ electro-magnetic devices in each location where a magnet is specified. An electro-magnetic device can be activated, for example, by switch 131 (FIG. 1).

Figure 9:
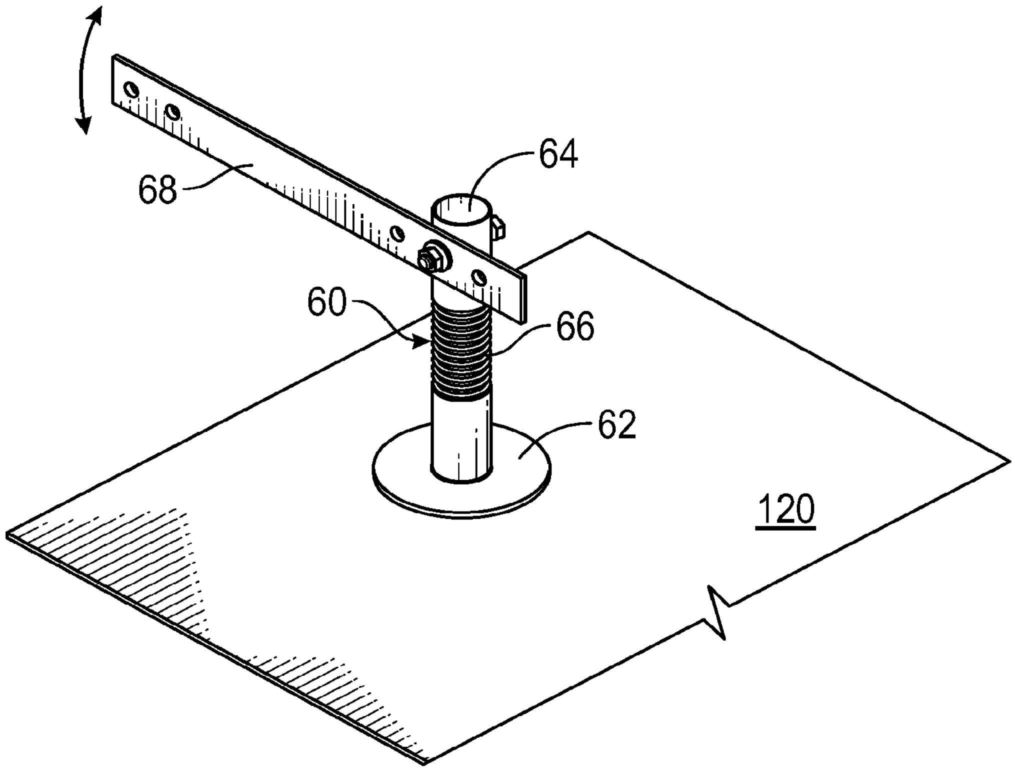
FIG. 9 is an isolated perspective view of a mounting structure for the auxiliary tool.

Referring now to FIG. 9, the construction and operation of support structure 60 are now explained. The support structure is preferably designed to enable easy placement, as well as subsequent adjustment and eventual easy detachment of the support structure, at any desired location on the mower deck 120. This is accomplished in this embodiment by providing a magnetic base member 62, that can be readily attached at any location. Preferably, support post 64 is provided with a means to render the post flexible, such as flexible member 66 located along the length of post 64, for example, a spring member or a member formed from flexible rubber or plastic. Thus, any auxiliary tool attached to support arm 68 will avoid being damaged by contact with any obstacle, due to the shock-absorbing structure provided by flexible member 66. Furthermore, while the magnetic attachment of the support structure to the mower deck is more than sufficient to maintain the auxiliary tool in its selected location and orientation, if the collision of the auxiliary tool with a stationary object is of too great of force, the magnetic attachment feature also provides the advantage that break-away of the tool from the mower can occur, so that neither the auxiliary tool, nor the support structure, nor the mower is damaged.

Support arm 68 can be either fixedly attached to support post 64, or it can be attached in a manner that provides vertical adjustment and/or rotational adjustment to the auxiliary tool 50 attached. In one embodiment, the support arm can be adjusted in height and/or horizontal arc of rotation with respect to the support post. Arm 68 can also or in the alternative be mounted for articulation in a vertical arc, as shown by the arrows in FIG. 9, to provide vertical adjustment of the tool 50.

Figure 11:
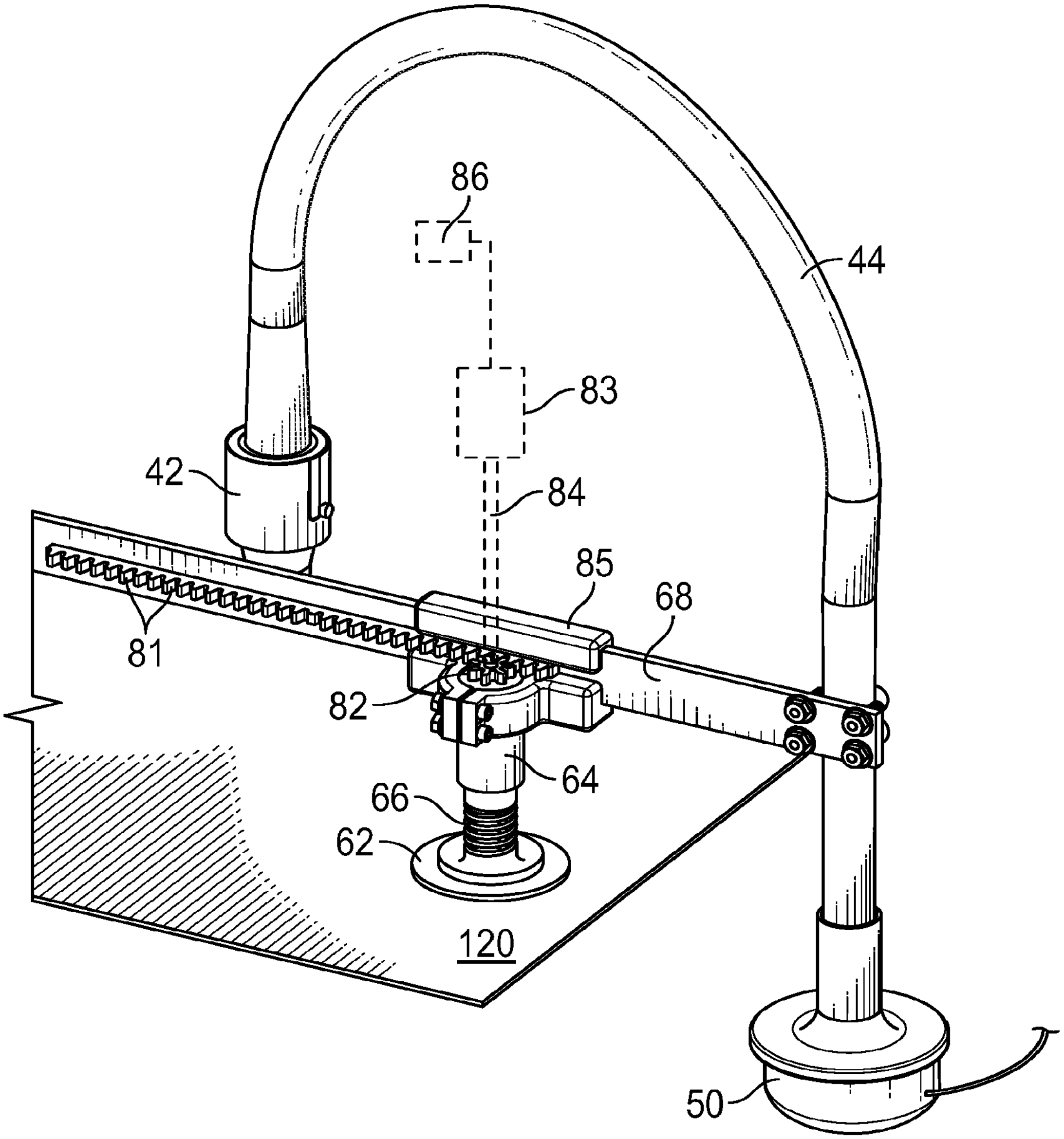
FIG. 11 is a perspective view of a mounting structure for the auxiliary tool that permits lateral adjustment of the tool by the operator.

With reference to FIG. 11, a preferred support structure 60 is illustrated which provides for the lateral adjustment of auxiliary tool 50. Support arm 68 is mounted so as to be horizontally supported by bracket 85 on support post 64 and to be horizontally slideable within bracket 85. In this preferred embodiment, lateral movement of support arm 68 is controlled by a rack-and-pinion drive comprised of rack teeth 81 formed on support arm 68 and a pinion member 82 mounted or rotation on support post 64. In its simplest form, the support arm 68 can simply be moved manually by the operator into the desired lateral location of the auxiliary tool 50. Also shown schematically is a drive member 83 that can be remotely controlled by the operator to extend and retract auxiliary tool 50. For example, drive member 83 can be a reversible electric motor that is controlled remotely by a toggle switch 86 mounted near the operator and connected to a source of electric power carried on the mower 100 or other implement, and operates the pinion gear 82 via drive shaft 84. Obviously, many other alternative arrangements can be used to laterally move the support arm 68 with respect to the support post 64.

It is preferable to provide the auxiliary power transmission arrangement of the invention with a means for selectively engaging and disengaging the auxiliary tool that is attached to the power-supplying implement. In the simplest sense, this can be accomplished by the operator manually disengaging the bayonet type coupling configuration 41 illustrated in FIGS. 3-6. In many instances, it is desirable for the operator to quickly and selectively engage and disengage the auxiliary tool 50 from the operator's seat, without taking his eyes off his work and/or without freeing one hand for an extended period of time or being distracted in any way. Most preferably, engagement and disengagement does not involve complete removal of the coupling configuration.

Figure 12:
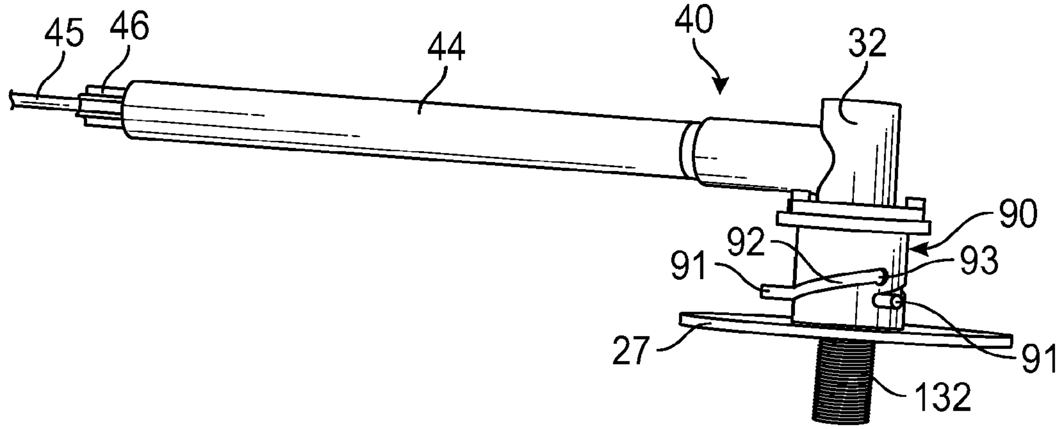
FIG. 12 is a perspective view of a preferred mechanism for selectively engaging and disengaging auxiliary power transmission arrangement according to the invention.
Figure 13:
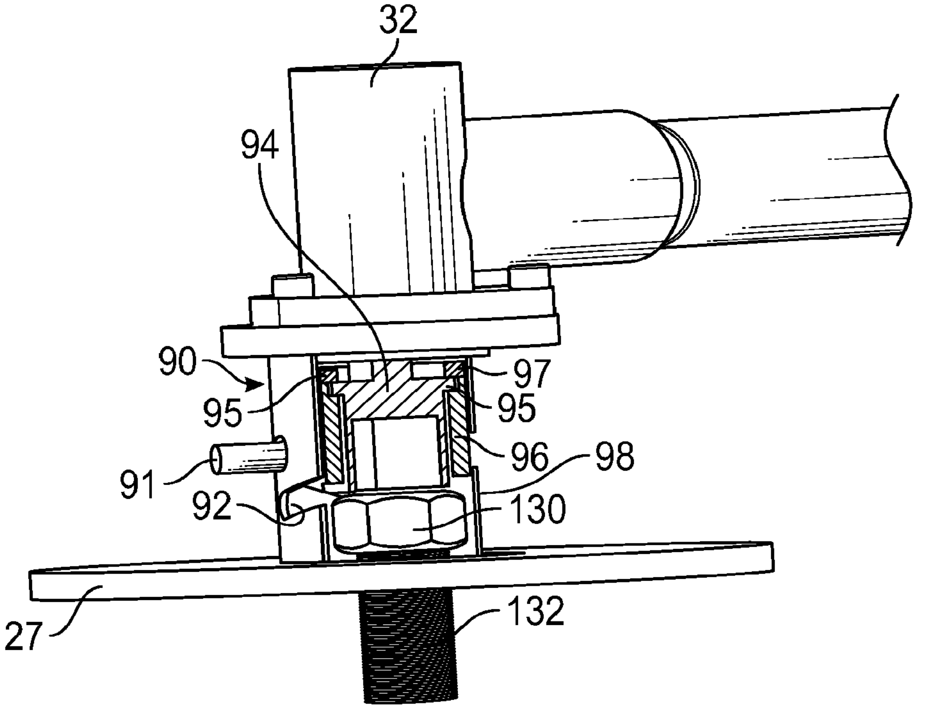
FIG. 13 is a perspective view, partially cut away, of the mechanism shown in FIG. 12, illustrating the interior parts of the mechanism in a disengaged position.
Figure 14:
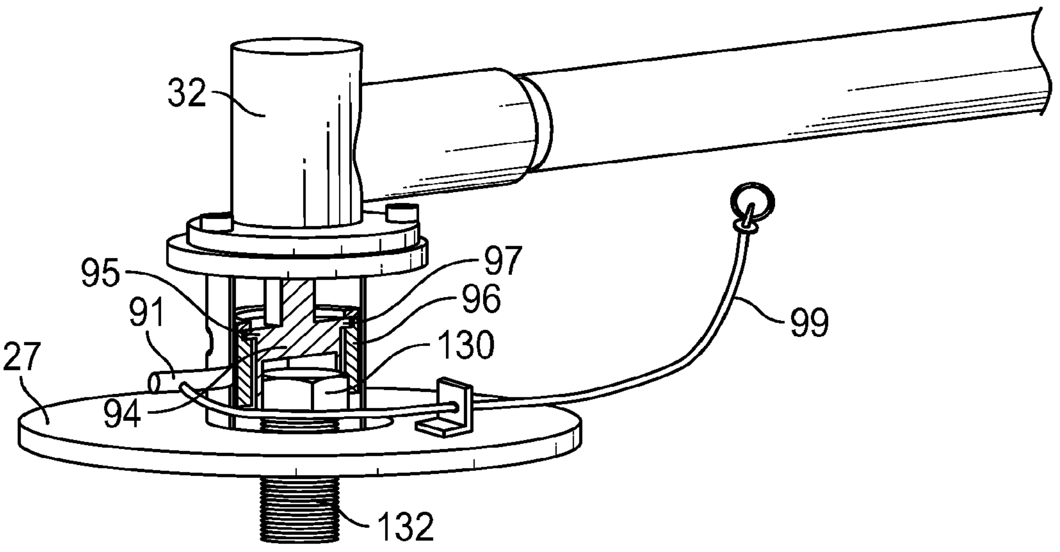
FIG. 14 is a perspective view, partially cut away, of the mechanism shown in FIG. 12, illustrating the interior parts of the mechanism in an engaged position.

A preferred embodiment for accomplishing this advantageous goal is illustrated in FIGS. 12-14, which show an auxiliary power transmission arrangement 40 that is preferably comprised of an angled power transmission member 32 that drives flexible cable 44 having cable core 45 and cable spacer 46. Between deck mounting plate 27 and transmission member 32 is a selective power engagement/disengagement mechanism 90, which as seen in FIGS. 13 and 14, is capable of selectively lowering socket piece 94 into engagement with bolt head 130, and selectively raising socket piece 94 out of engagement with bolt head 130 by means of a helical slot and pin arrangement. Rotatable socket sleeve 96 and socket piece 94, and has attached to it one or more helix lifting pins 91 that are slideable in cooperating helix slots 92, by which socket sleeve 96 can be rotated to selectively lift or lower sleeve 96. Socket piece 94, which contains the socket corresponding in shape to the bolt head 130, is rotatably suspended within socket sleeve 96 by socket piece flange 95 that travels in socket sleeve groove 97. FIG. 13 shows socket piece 94 selectively lifted out of engagement with bolt head 130, whereas FIG. 14 shows socket piece 94 selectively lowered into engagement with bolt head 130.

Selective engagement and disengagement of the auxiliary power transmission arrangement 40 can be done by the operator manually engaging and rotating one of the helix lifting pins 91; however, most preferably, the operator can remotely move/rotate the helix lifting pin 91, for example, with a push-pull cable 99 (shown schematically in FIG. 14) that is accessible at a location near the operator's seat. This control, as well as the remote control 86 (FIG. 11) for laterally adjusting the position of the auxiliary tool 50, can be incorporated into the control arrangement 131 on the mower, or in the case of a retrofitted auxiliary power transmission arrangement according to the invention, one or more of the remote control devices (86, 99) can be supplied in the form of an auxiliary control panel that is adapted to be temporarily attached to the implement, in the vicinity of the operator's seat. Temporary attaching can be accomplished by a suitable clamp arrangement attached to the auxiliary control panel, or more preferably by the auxiliary control panel having a magnetic attachment element that can be selectively attached to the implement structure near the operator's seat.

According to another aspect of the present invention, a solution is provided for another problem that can be encountered when operating an auxiliary tool by a primary power source, namely, the problem that damage can occur in the auxiliary power transmission arrangement if the auxiliary tool encounters and obstacle that arrests or binds the rotation of the auxiliary tool. In this case, the flexible cable that drives the auxiliary tool can be damaged or even broken. It is desired to provide shock-absorbing protection against the cable being damaged when an event like this occurs.

Figure 10:
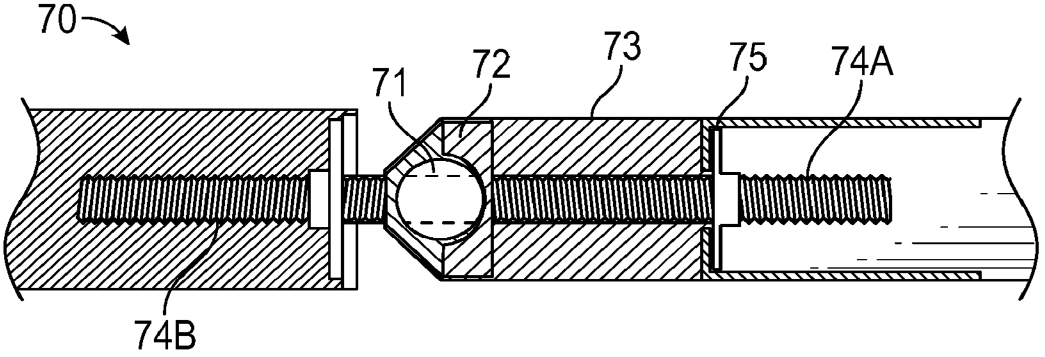
FIG. 10 is a cross-sectional view of a preferred embodiment of a cable clutch that may optionally be included in the auxiliary power transmission arrangement of the invention.

FIG. 10 illustrates one preferred way of accomplishing this protection, by including in the flexible power-transmitting cable 44 a clutch mechanism, such as that shown in FIG. 10. Shown is a ball cable clutch 70 comprised of a clutch ball 71 fixedly attached to one segment of cable 74A, and a clutch cavity member 72 fixedly attached to the other cable segment 74B, with the clutch ball 71 resting in the cavity of cavity member 72. Spring 73 is under compression between cable collar 75 and clutch cavity member 72. Under normal compression force, clutch ball 71 cannot rotate within clutch cavity member 72, so that it conveys the rotational force between cable segments 74A and 74B, to drive the auxiliary tool 50. The degree of compression is set so that, in the case of a temporary slow-down or stoppage of tool 50, the ball 71 will be caused to slip in cavity member 72, to prevent damage or breakage of the cable. In the event that the tool strikes an immovable object that tends to stop rotation of the tool, the ball cable clutch mechanism will protect the tool from damage by providing at least some degree of slippage between tool and driving force within the cable.

The ball cable clutch mechanism described here not only has the advantage of providing a simple shock-absorbing or break-away method of protecting the cable from damage, but also offers another way of selectively engaging and disengaging the auxiliary tool 50.

Any mechanism for selectively shortening cable segment 74A, e.g., by having a gap that can be pulled together or by having a cam mechanism that can be selectively rotated to shorten or lengthen that cable segment, causes the frictional force between ball and cavity to increase or decrease, thereby selectively transmitting force from cable segment 74A to cable segment 74B. Alternatively, shortening of cable segment 74A can also be accomplished by simply bending the cable segment.

The present invention has been described and illustrated with reference to certain preferred embodiments. Many alternative but equivalent changes and/or configurations will be apparent to persons skilled in the art upon reading this description. It is to be understood, therefore, that the scope of protection is to be determined by the appended claims, which are intended to encompass such obvious equivalents.

LIST OF REFERENCE NUMERALS power coupling device 20
bayonet coupling receiver 22
plate 24
legs 26
deck mounting plate 27
magnets 28
slots 27
bolts 29
angled power transmission member 32
auxiliary power transmission arrangement 40
bayonet-type coupling configuration 41
bayonet-shaped fitting 42
hexagonal recess 43
flexible drive cable 44
drive cable core 45
drive cable spacer 46
string trimmer 50
support structure 60
magnetic base member 62
support post 64
flexible member 66
support arm 68
ball cable clutch 70
clutch ball 71
cavity member 72
Spring 73
segment of cable 74A
cable segment 74A
cable collar 75
rack gears 81
pinion gear 82
horizontal support 83
drive shaft 84
bracket 85
toggle switch 86
selective power engaging/disengaging mechanism 90
helix lifting pin 91
helix slot 92
lock-out helix detent 93
socket piece 94
socket piece flange 95
rotatable socket sleeve 96
rotatable socket sleeve groove 97
casing 98
push-pull cable 99
zero-turn mower (ZTR mower) 100
rear drive wheel 104
ZTR mower has a frame 106
front wheels 108
engine 110
operator seat 112
control levers or sticks 114
base 117 of each motion control lever
mower deck 120
belt drive system 122
drive belt 124
pulley guard cover 128
drive pulley 129
pulley bolt head 130
switch 131
pulley bolt 132
opening 140

What is claimed is:

1. A device for extracting auxiliary power from a power source installed on a mower and supplying the auxiliary power to an auxiliary tool associated with the mower, the device for extracting auxiliary power comprising;

a coupling device that is adapted to interact with the power source installed on the mower, wherein, when the coupling device is positioned to interact with the power source, the coupling device extracts auxiliary power from the source;

the auxiliary tool associated with the mower in a manner such that the auxiliary tool is configured to be operated by the auxiliary power that is extracted by the coupling device from the power source that is installed on the mower;

a support arm coupled to and supporting the auxiliary tool, the support arm attached in a manner that provides lateral adjustment to extend and retract the auxiliary tool; and an auxiliary power transmission arrangement for transmitting auxiliary power from the coupling device to the auxiliary tool;

a cover member having an appropriate opening therein for installing the coupling device;

wherein the couple device is capable of being configured into a plurality of different configurations and is thereby capable of being retrofitted to any of a plurality of differently-configured power source arrangements;

wherein the support arm is mounted in a horizontally supported position, the support arm including a first engagement member that engages with a second engagement member on a support element to control the horizontal adjustment of the auxiliary tool by mechanical operation of the first engagement member with the second engagement member; and wherein the first engagement member comprises a pinion gear or rack teeth and the second engagement member comprises a pinion member that interact to control the horizonal adjustment.

2. An auxiliary power extracting device as claimed in claim 1, wherein the coupling device comprises a socket that couples with the bolt head or nut on a drive and/or driven-pulley.

3. An auxiliary power extracting device as claimed in claim 1, wherein the auxiliary tool comprises a shock-absorbing device including a tool support comprising a flexible member.

4. An auxiliary power extracting device as claimed in claim 1, wherein the auxiliary tool is capable of plural arbitrarily-selectable mounting configurations upon the implement.

5. An auxiliary power extracting device as claimed in claim 1, wherein the auxiliary tool comprises a shock-absorbing device including a tool support comprising a flexible member.

6. An auxiliary power extracting device as claimed in claim 1, wherein a moving part from which the auxiliary power is taken is associated with a pulley on a mower deck of the mower.

7. An auxiliary power extracting device as claimed in claim 1:

wherein the auxiliary tool comprises a trimmer; and wherein the auxiliary power is taken from a moving part associated with a component of the mower.

8. An auxiliary power extracting device as claimed in claim 7, wherein at least one of the coupling device and the auxiliary tool comprises a shock-absorbing and/or breakaway feature.

9. An auxiliary power extracting device as claimed in claim 7, wherein a moving part from which the auxiliary power is taken is associated with a pulley on the mower deck.

10. An auxiliary power extracting device as claimed in claim 7, wherein the coupling device comprises at least one movable support member for supporting the coupling device on the mower.

11. An auxiliary power extracting device as claimed in claim 7, wherein the auxiliary tool further comprises a device for selectively adjusting the lateral position of the auxiliary tool with respect to the implement.

12. An auxiliary power extracting device as claimed in claim 1, wherein at least one of the coupling device and the auxiliary tool comprises a shock-absorbing and/or breakaway feature.

13. An auxiliary power extracting device as claimed in claim 1, wherein the mowing device has a mower deck that comprises at least one pulley with which the coupling device interacts.

14. The auxiliary tool in claim 1, wherein the auxiliary tool support arm is attached in a manner that provides vertical adjustment to the auxiliary tool attached.

15. The auxiliary tool in claim 1, wherein the auxiliary tool support arm is attached in a manner that provides rotational adjustment to the auxiliary tool attached.

16. The auxiliary tool in claim 1, further comprising a spring member positioned in a support post between opposing portions of the support post, wherein the spring member allows for compression, slippage and/or shock absorption between the opposing portions to provide flexibility of the support post.

17. The auxiliary tool in claim 1, wherein an angled power transmission member rotates about a central axis, and wherein an auxiliary power transmission arrangement includes a fitting configured to rotationally couple with the angled power transmission member to transmit auxiliary power from the power source.

18. An auxiliary power extracting device as claimed in claim 1, wherein a moving part from which the auxiliary power is taken is associated with a driven pulley on a mower deck of the mower.

* * * * *